United States Patent [19]

Yamada

[11] Patent Number: 4,666,284
[45] Date of Patent: May 19, 1987

[54] MICROFILM COPYING APPARATUS

[75] Inventor: Hiroshi Yamada, Ichikawa, Japan

[73] Assignee: Ricoh Company, Ltd., Tokyo, Japan

[21] Appl. No.: 808,053

[22] Filed: Dec. 12, 1985

[30] Foreign Application Priority Data

| Dec. 17, 1984 | [JP] | Japan | 59-265975 |
| Jan. 16, 1985 | [JP] | Japan | 60-3983[U] |
| Feb. 7, 1985 | [JP] | Japan | 60-22368 |

[51] Int. Cl.$^4$ ............................................. G03G 15/00
[52] U.S. Cl. .......................................... 355/5; 355/11; 355/44; 355/45
[58] Field of Search .................. 355/11, 3 R, 14 R, 18, 355/19, 39, 55, 56, 67, 5, 44, 45

[56] References Cited

U.S. PATENT DOCUMENTS

| 4,341,463 | 7/1982 | Kashiwagi et al. | 355/5 X |
| 4,367,033 | 1/1983 | Watanabe | 355/5 |
| 4,494,859 | 1/1985 | Frias et al. | 355/5 |
| 4,593,996 | 6/1986 | Kubono et al. | 355/5 |

Primary Examiner—A. C. Prescott
Attorney, Agent, or Firm—Oblon, Fisher, Spivak, McClelland & Maier

[57] ABSTRACT

A microfilm copying apparatus magnifies and copies images on microfilms. The microfilm copying apparatus can be constructed as a microfilm reader-printer. The microfilm copying apparatus has an illuminating optical system for illuminating a microfilm having an image to be copied and a slit exposure optical system having a projection lens. The illuminating optical system and the projection lens are movable in optically coaxial relation in a direction normal to a common optical axis thereof in synchronism with movement of the surface of the photosensitive body. Where the microfilm copying apparatus is constructed as a microfilm reader-printer, it has a screen housing unit disposed above a base apparatus portion and angularly movable into and out of contact therewith, and a light shielding plate is mounted on a first exposure mirror having a reflecting surface which is positioned in a focused light beam from the microfilm image when the microfilm image is copied. When the microfilm image is copied, external light from a screen is prevented by the light shielding plate from falling on the first exposure mirror.

5 Claims, 8 Drawing Figures

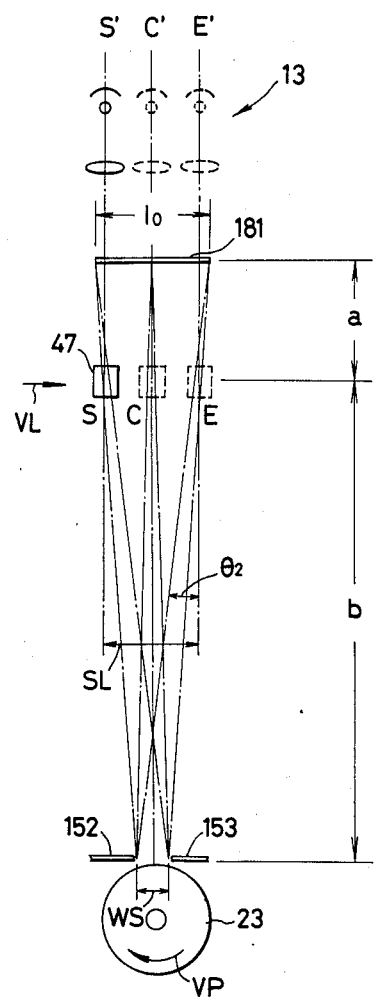
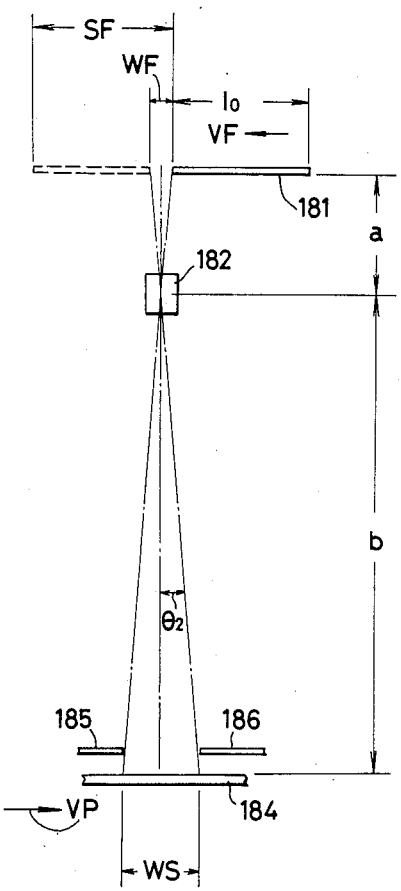

MICROFILM COPYING APPARATUS

BACKGROUND OF THE INVENTION

The present invention relates to a microfilm copying apparatus for magnifying and copying microfilm images.

There are known microfilm copying apparatus for magnifying and copying microfilm images. Typical prior optical systems for exposing photosensitive bodies to light through slits in the known microfilm copying apparatus include arrangements shown in FIGS. 7 and 8.

In the optical arrangement shown in FIG. 7, the image on a microfilm 181 is projected by a projection lens 182 onto a photosensitive body 184 at a magnification m (=b/a). The projection lens 182 has an optical axis aligned with the optical axis of an illuminating optical system (not shown). While the projection lens 182 and the illuminating optical system are kept at rest in the apparatus, the microfilm 181 and the photosensitive body 184 are displaced in the directions of the illustrated arrows at speeds VF, VP, respectively. The speeds VF, VP meet the relationship VF =mVP. The distance which the microfilm 181 is displaced is equal to the sum SF of the size Io of the microfilm image and the width WF of a slit through which light from the illuminating optical system is passed toward the microfilm 181. The slit width WF is equal to WS/m where WS is the width of a slit through which light from the projection lens 182 is passed toward the photosensitive body 184, and which is defined by light shielding plates 185, 186.

The magnification m is generally in the range of from 10 to 20, and the slit width WS generally ranges from 5 to 10 mm. In the system of FIG. 7, therefore, a half angle $\theta_2$ of view for slit exposure is at most 0.5°, and any exposure irregularity or imperfection on the photosensitive body 184 in the direction transversely across the exposure slit is at most 1% or substantially nil.

Microfilms are available in various formats such as aperture cards and roll films, and in different sizes ranging from small sizes up to microfiche in A6 size. To make the microfilm copying apparatus usable for different microfilm formats and sizes, it is required to have different microfilm holders and convey them for exposure. As disclosed in Japanese Laid-Open Patent Publication No. 59(1984)-30527, the microfilm holders are conveyed by a step motor, which is highly advantageous in that it can easily meet various magnifications. However, the step motor is not capable of cope with a variety of load variations, and the speed of movement of the microholders which are different in formats and weights cannot be controlled by the step motor.

The slit exposure system shown in FIG. 8 is designed to eliminate the aforesaid problem. The image on a microfilm 181 is projected through a slit onto a photosensitive body 189 through a projection lens 183 and mirrors 187, 188.

The microfilm 181 and the projection lens 183 are held at rest in the microfilm copying apparatus. The photosensitive body 189 is exposed to light by moving the mirrors 187, 188 in unison in the direction of the arrow at a speed VM in synchronism with the movement of the surface of the photosensitive body 189 at a speed VP. The slit through which the light from the mirrors 187, 188 passes toward the photosensitive body 189 is defined by a pair of light shielding plates 190, 191.

If an angle $\phi$ is formed between optical axes X, Y, then the speed VM of movement of the mirrors 187, 188 is expressed by VP/2 cos($\phi$/2). If the optical axes X, Y are parallel to each other ($\phi$=0) as shown in FIG. 8, then the speed VM is given by VP/2. The distance SM that the mirrors 187, 188 travel is generally expressed by:

$$SM = \frac{mIo}{2 \cdot \cos\phi/2}$$

The distance SM in FIG. 8 ($\phi$=0) is:

$$SM = mIo/2$$

where Io is the size of the microfilm image and m is the magnification.

Since only the mirrors 187, 188 are movable irrespectively of the format and weight of the microfilm holder used, this exposure system is free of the problem described with reference to FIG. 7. The half angle $\theta_3$ of view required for slit exposure through the projection lens 183 is however in the range of from 15° to 20°. Because of the cosine law, the illuminance in the direction of travel of the photosensitive body 189 varies up to 20% as the mirrors 187, 188 are displaced. To produce good copied images, the microfilm copying apparatus must be equipped with a dedicated corrective means for correcting such illuminance variations, and hence is complex in structure.

Where a microfilm copying apparatus is constructed as a microfilm reader-printer, a screen housing unit holding a screen is generally positioned in an upper portion of the apparatus, and a copying mechanism including a photosensitive body and an optical system for leading a focused beam of light to the photosensitive body are generally positioned in a lower portion of the apparatus and disposed in an apparatus base on which the screen housing unit is supported.

In known microfilm reader-printers, the screen and the screen housing unit have to be disassembled and detached when the optical system or other mechanisms are to be repaired, maintained, or cleaned. It is therefore tedious and time-consuming to operate upon the microfilm reader-printers for repair, maintenance, or cleaning.

The prior microfilm reader-printers employ one common focusing lens for both displaying a microfilm image on the screen and copying the microfilm image. In general, therefore, a first exposure mirror is angularly movable between a position in which the mirror is retracted from the focused beam of light when the image is to be displayed on the screen and another position in which the mirror is in the focused beam of light. When the first exposure mirror is to be moved into the focused beam of light, external light passing through the screen falls on the first exposure mirror and is reflected thereby as stray light which adversely affects the copying process. Inasmuch as positioning means and light shielding means for the first exposure mirror are separate from each other, the overall structure is complex and highly costly.

SUMMARY OF THE INVENTION

It is a first object of the present invention to provide a microfilm copying apparatus capable of exposing a photosensitive body to light bearing a microfilm image through a slit without moving the mirofilm and also of such exposure subjected to reduced exposure variations or fluctuations in the direction in which the surface of the photosensitive body is moved.

A second object of the present invention is to provide a microfilm copying apparatus which, when constructed as a microfilm reader-printer, is less tedious and time-consuming to operate upon for repair, maintenance, or cleaning.

A third object of the present invention is to provide a microfilm copying apparatus which, when constructed as a microfilm reader-printer, has means for preventing external light passing through a screen from acting as stray light in the copying process.

To achieve the first object, a slit exposure device for exposing a photosensitive body to light through a slit has an illuminating optical system, a slit exposure optical system, and displacing means. The illuminating optical system has a light source and condenser means. The condenser means serves to concentrate the light from the light source on a microfilm to illuminate the same. The slit exposure optical system focuses a slit-shaped image of the microfilm illuminated by the illuminating optical system on the photosensitive body. The displacing means moves a projection lens of the slit exposure optical system and the illuminating optical system in optically coaxial relation in a direction normal to a common optical axis thereof, i.e., in a direction along movement of the surface of the photosensitive body, in synchronism with such movement of the surface of the photosensitive body. Stated otherwise, the movement of the microfilm image (caused by the movement of the projection lens effected by the displacing means) is equal to the movement of the surface of the photosensitive body.

When the photosensitive body is exposed to the light, the microfilm remains stationary. Even if microfilm holders of different shapes are mounted in position, the slit exposure is not affected by the different weights of the microfilm holders. Since the movable component, i.e., the projection lens, is constant in weight, it can be moved by a step motor at various speeds corresponding to selected magnifications.

During the slit exposure, the illuminating optical system and the projection lens are moved in unison, so that the microfilm can be illuminated under best condition at all times. The half angle of view at the projection lens is small during the slit exposure, and hence any illuminance irregularities on the photosensitive body in the direction of movement of the surface thereof are also small. Assuming that an actual magnification ranges from 10 to 20, the half angle of view is at most 1 degree, and the illuminance variation is at most 1%.

The second object can be accomplished as follows: A microfilm reader-printer has a screen housing unit and a base apparatus portion, the screen housing unit being disposed above the base apparatus portion and angularly movable into and out of contact therewith. Since the screen housing unit can be moved out of contact with the base apparatus portion, the optical system can easily and efficiently be repaired, cleaned, and maintained.

The third object can be achieved in the following manner: A first exposure mirror device has a first exposure mirror for guiding light from a microfilm toward a photosensitive body, the first exposure mirror being movable from an operative position in which a microfilm image is copied and a retracted position in which the microfilm image is displayed on a screen. The first exposure mirror device also includes a light shielding plate, a torsion spring, and a grooved cam plate. The first exposure mirror is swingably supported in position and has its reflecting surface positioned in the focused light beam from the microfilm when the microfilm image is to be copied. The light shielding plate is pivotally mounted on the free end of the first exposure mirror and supports a roller on its free end. The torsion spring acts between the first exposure mirror and the light shielding plate for resiliently urging the light shielding plate to turn away from the first exposure mirror. The grooved cam plate engages the roller on the free end of the light shielding plate for guiding movement of the light shielding plate when the first exposure mirror is angularly moved. The first exposure mirror, the light shielding plate, and torsion spring, and the grooved cam plate are related to each other such that when the first exposure mirror is in the operative position to copy the microfilm image, the light shielding plate prevents external light passing through the screen from falling on the first exposure mirror. The first exposure mirror is positioned in the operative position by the light shielding plate, the roller, and the grooved cam plate.

When the microfilm image is to be duplicated, the external light from the screen is effectively prevented by the light shielding plate from impinging upon the first exposure mirror as stray light which would otherwise adversely affect the copying process.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 a schematic view explanating slit exposure according to the present invention;

FIGS. 7 and 8 are schematic views showing conventional exposure systems.

DESCRIPTION OF THE PREFERRED EMBODIMENTS

A microfilm copying apparatus constructed as a microfilm reader-printer will be described with reference to FIGS. 4 through 6.

Figure 6:
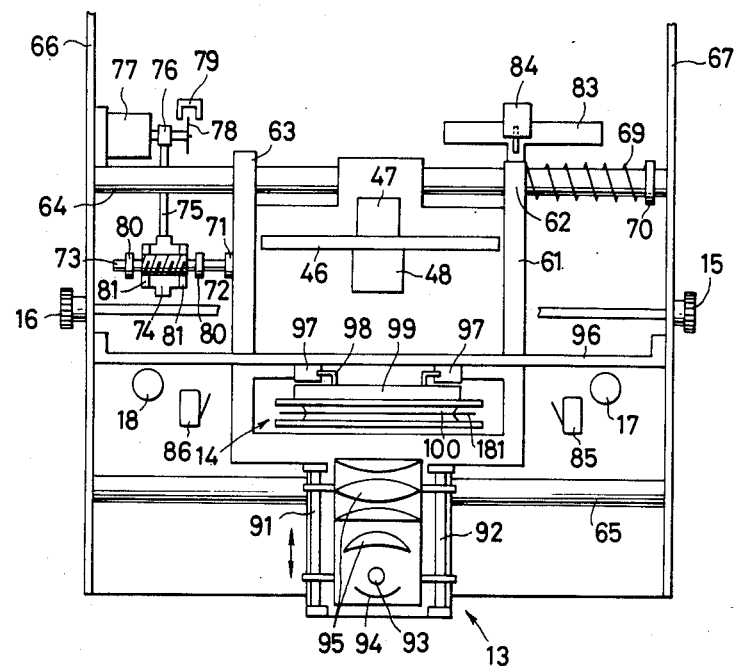
FIG. 6 is a plan view showing the movable parts of a slit exposure device.

As shown in FIG. 6, a microfilm holder 14 comprises a table plate 98 engaging grooved rails 97 fastened to a stationary base plate 96 and vertically (FIG. 4) slidable in response to turning of a vertical shifting knob 17, and a film pressing device 100 engaging the table plate 98 through a pair of grooved rails 99 and horizontally (FIG. 4) slidably in response to turning of a horizontal shifting knob 18. The film pressing device 100 is vertically (FIG. 4) detachable from the table plate 98, so that various film pressing devices for supporting different microfilm formats can be replaceably mounted on the table plate 98. The film pressing device 100 comprises a pair of flat glass plates for sandwiching a microfilm 181 flatwise therebetween under the bias of a spring (not shown).

Figure 4:
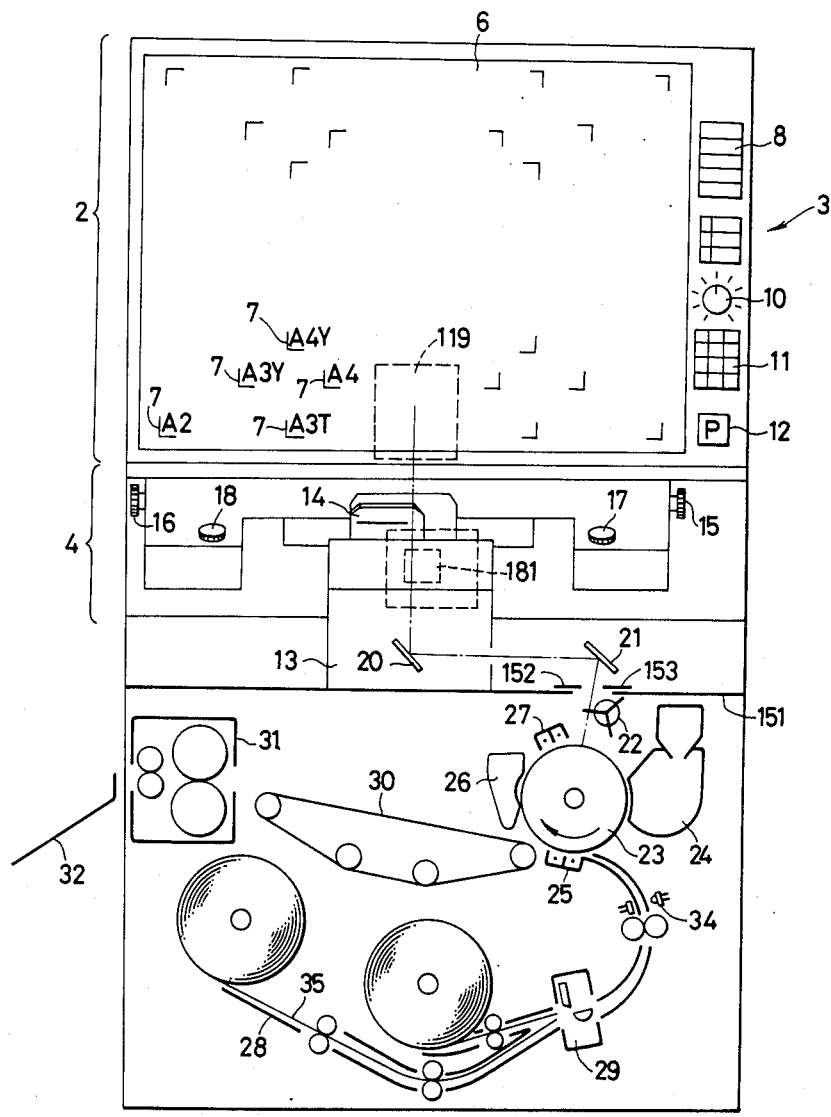
FIG. 4 is a front elevational view, partly cut away, of the microfilm reader-printer.

When the image of the microfilm 181 supported on the microfilm holder 14 is not to be copied but projected, the microfilm image is illuminated by an illuminating optical system 13 and magnified by one of a plurality of projection lenses 47, 48 which is selected by a magnification selecting knob 16 (FIG. 4). The magnified microfilm image is then reflected by a projection mirror 42 in a screen housing unit 2 and projected onto a screen 6 therein.

The magnified microfilm image projected onto the screen 6 is focused by a focus adjusting knob 15, and positionally adjusted by moving the microfilm 181 with the vertical and horizontal shifting knobs 17, 18. For producing a magnified copy of the microfilm image displayed on the screen 6, the magnified image is brought into registry with one of copy size markings 7 on the screen 6, and desired sheets of paper are selected by a copy size selector switch 8 on a control panel 3. Then, the amount of exposure is adjusted by an exposure adjusting knob 10, the number of copies to be made is entered by a copy number setting switch 11, and a print switch 12 is pressed to start a copying process.

Figure 3:
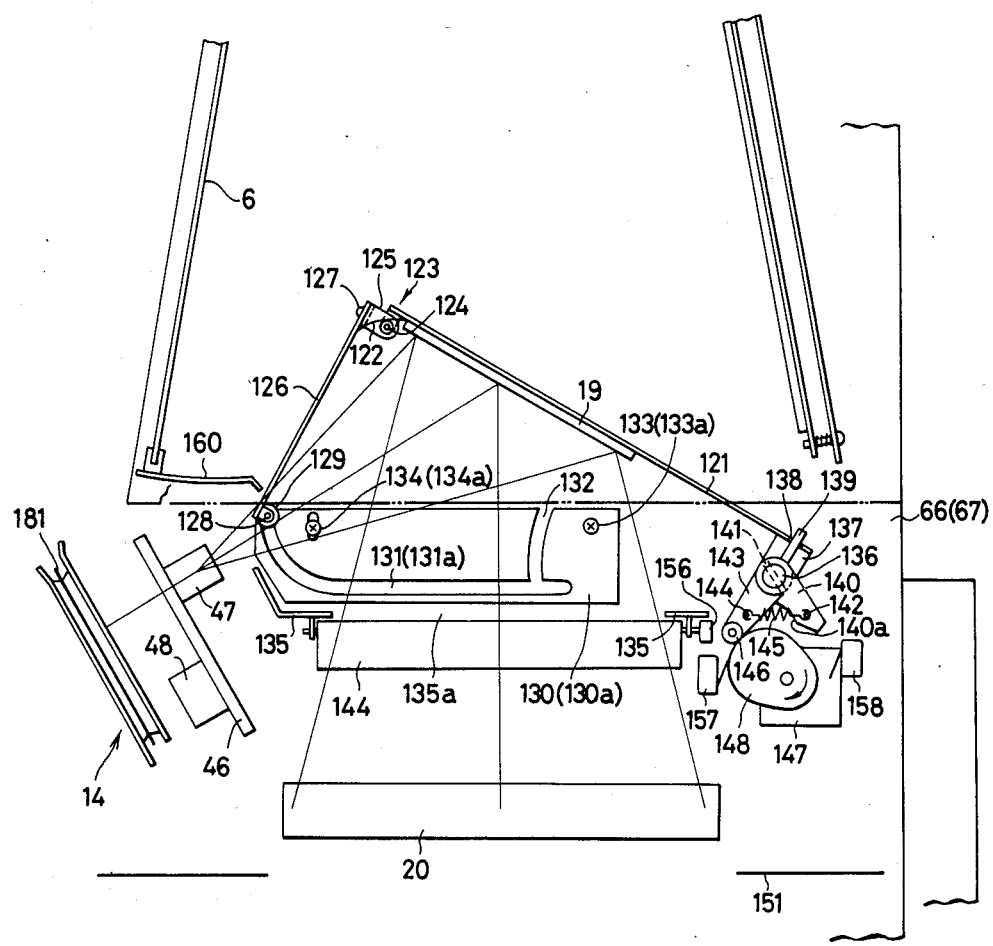
FIG. 3 is a side elevational view showing the position of a first exposure mirror in the copying process.

As shown in FIG. 3, the image of the microfilm 181 supported on the microfilm holder 14 is magnified and projected by the selected projection lens such as the projection lens 47, and reflected successively by a first exposure mirror 19 and a second exposure mirror 20. The image is then reflected by a third exposure mirror 21 (FIG. 4) and focused on a photosensitive body 23.

As illustrated in FIG. 4, the photosensitive body 23 is driven to rotate at a constant speed in the direction of the arrow. In order for an electrostatic latent image of the microfilm image to be formed on the photosensitive body 23, the speed of movement of the microfilm image on the photosensitive body 23 should be equal to the speed of movement of the surface of the photosensitive body 23. To achieve this speed equalization, the illuminating optical system 13 and the projection lens 47 are moved in unison at a prescribed speed to the right in FIG. 6 as will be described in greater detail.

In FIG. 4, the photosensitive body 23 is first uniformly charged by an erasing/charging charger 27, and then exposed to the magnified optical image of the microfilm image so that an electrostatic latent image corresponding to the microfilm image will be formed on the photosensitive body 23. The latent image is then developed into a visible toner image by a development unit 24. An image transfer sheet 35 is fed from a sheet feeder unit 28, cut off to a desired length by a cutter unit 29, and delivered into an image transfer section in which the toner image is transferred onto the sheet 35 by a transfer/ separation charger 25 and the sheet 35 is separated from the photosensitive body 23 by the transfer/separation charger 25. Then, the sheet 35 is conveyed by a separation/conveyor unit 30 into a fixing unit 31. After the toner image has been fixed to the sheet 35 by the fixing unit 31, the sheet 35 is discharged onto a sheet tray 32.

After the toner image has been transferred from the photosensitive body 23, any remaining toner is removed therefrom by a cleaning unit 26, and any remaining electrostatic charges are removed therefrom by the erasing/charging charger 27. The photosensitive body 23 is uniformly charged again by the erasing/charging charger 27 in preparation for a next copying cycle. The electrophotographic copying process described above is well known in the art and will not be described in more detail.

The principles of exposure to slit light employed in the microfilm copying apparatus of the present invention will be described with reference to FIG. 1. The illuminating optical system shown in FIGS. 5 and 6 is generally denoted at 13 in FIG. 1.

The illuminating optical system 13 and the projection lens 47 as selected are disposed one on each side of the microfilm 181, and have an aligned common optical axis. The illuminating optical system 13 and the projection lens 47 are movable in unison horizontally in FIG. 1, i.e., in a direction normal to the optical axis thereof.

When the photosensitive body 23 is exposed to light through a slit defined between light shielding plates 152, 153, it is rotated clockwise at such an angular velocity that the surface thereof moves at a speed VP. At the same time, the illuminating optical system 13 and the projection lens 47 are moved in unison to the right at a given speed $VP/(1+m)$. The exposure of the photosensitive body 23 to the slit light is essentially started when the projection lens 47 is in the position S and the illuminating optical system 13 is in the position S', and finished when the projection lens 47 is in the position E and the illuminating optical system 13 is in the position E' The projection lens 47 and the illuminating optical system 13 are displaced a distance SL during the exposure to the slit light. Denoted at $\iota$ is a half angle of view employed for the projection lens 47 to expose the photosensitive body 23 to the light therethrough.

The actual arrangement for carrying out the above exposure to the slit light will be described with reference to FIG. 6. The illuminating optical system 13 comprises a lamp 93 serving as a light source, a spherical mirror 94, and a group of condenser lenses 95. The illuminating optical system 13 is guided by shafts 91, 92 mounted on a supoprt frame 61 for sliding movement in the directions of the arrowheads. The spherical mirror 94 and the condenser lens group 95 jointly constitute a condenser means. The position of the illuminating optical system 13 in the direction of the optical axis can be adjusted in coaction with the turning of a turret plate 46 so that the illuminance on the photosensitive body 23 will be uniform along its axis of rotation.

The plural projection lenses 47, 48 are threadedly mounted on the turret plate 46, which can be rotated to select one of the projection lenses dependent on the desired magnification. The turret plate 46 also carries counterweights to make the overall weight of the projection lenses well-balanced.

The illuminating optical system 13 and the turret plate 46 with the projection lenses 47, 48 mounted thereon are coaxially mounted on the supoprt frame 61, which has one side (upper side in FIG. 6) slidably supported on a main shaft 64 by bearings 62, 63 and the opposite side rollingly supported on an auxiliary shaft 65 (FIG. 5) by a roller 68 rotatably mounted on the supoprt frame 61. The supoprt frame 61 is normally urged to move to the left in FIG. 6 by a compression coil spring 69 disposed around the main shaft 64 and retained at one end by a pin 70. The supoprt frame 61 is positioned by an externally threaded rod 73 having one end 72 held against a raised portion 71 of the support frame 61.

The externally threaded rod 73 is nonrotatably but axially slidably supported by a pair of bearings 80 mounted on a fixed member (not shown), and is threaded in an internally threaded member 74 that is rotatably but axially immovably supported by a pair of bearings 81. The internally threaded member 74 has a pulley on its outer cirfumerence, and is driven to rotate by a belt 75 trained around the pulley and a pulley 76 mounted on the output shaft of a step motor 77. The main shaft 64, the roller 68, the auxiliary shaft 65, the spring 69, the externally threaded rod 73, the internally threaded member 74, the pulley thereof, the pulley 76, the belt 75, and the step motor 77 jointly serve as a displacing means for moving the support frame 61.

On the output shaft of the step motor 77, there is mounted an encoder disk 78 having a single slit of a width of about 0.1 mm and positioned adjacent to a photosensor 79 which generates a signal in response to light passing through the slit of the encoder disk 78. A photointerrupter 83 mounted on the support frame 61 also has a slit of a width of about 0.1 mm for passing light to a photosensor 84 to enable the same to generate a signal.

When the microfilm image is projected onto the screen 6 for observation (FIG. 5), the photosensors 78, 84 generate their signals in response to the light passing through the slits of the encoder disk 78 and the photointerrupter 83. The photosensor 89, the encoder disk 78, the photosensor 84, and the photointerrupter 83 are positionally adjusted such that the optical axis of the projection lens used is aligned with the center of the screen 6 at this time. The support frame 61 is now in a reference position, and the signals from the photosensors 79, 84 which represent such a reference position are fed to a control circuit.

The horizontal movement (FIG. 6) of the support frame 61 is limited by a pair of horizontally spaced limit switches 85, 86 actuatable by contact with the support frame 61. The photointerrupter 83 is of such dimensions that it does not run off the photosensor 84 while the support frame 61 is in the range of movement between the limit switches 85, 86.

The control circuit will operate as follows: When the frame 61 is not in the reference position, the step motor 77 is energized to rotate either clockwise or counterclockwise to move the support frame 61 in one direction. Upon actuation of the limit switch 85 or 86 by the support frame 61, it produces a signal to rotate the step motor 77 in the reverse direction. The support frame 61 and hence the photointerrupter 83 are then moved in the opposite direction, and the slit of the photointerrupter 83 is detected by the photosensor 84. When the slit of the encoder disk 78 is detected by the photosensor 79 while the signal is being generated by the photosensor 84, the step motor 77 is de-energized to lock the support frame 61 in the reference position.

The range in which the slit of the photointerrupter 83 is detectable by the photosensor 84 is smaller than the distance which the support frame 61 is moved upon one revolution of the encoder disk 78, and only the single slit which is about 0.1 mm wide is defined in the encoder disk 78, as described above. Therefore, the signal for positioning the support frame 61 in the reference position is generated highly accurately.

A process for exposing the photosensitive body 23 to the magnified and projected microfilm image will be described below.

When the print switch 12 (FIG. 4) is actuated, the lamp 93 (FIG. 6) of the illuminating optical system 13 is de-energized, and the turret plate 46 and the support frame 61 are moved to the left (FIG. 6) by a distance dependent on the selected copying magnification and copy size by the movement of the externally threaded screw 73 caused by the step motor 77 and under the resilient force of the spring 69.

The illuminating optical system 13 and the projection lens 47 are moved in unison from the position C'C leftwardly to the position S'S as shown in FIG. 1. At this time, a motor 147 (FIG. 3) is rotated in the direction of the arrow to turn a constant-angular-velocity cam 148 for turning a follower lever 143 clockwise through a roller 146, the follower lever 143 being angularly movably supported on a shaft 136.

Figure 5:
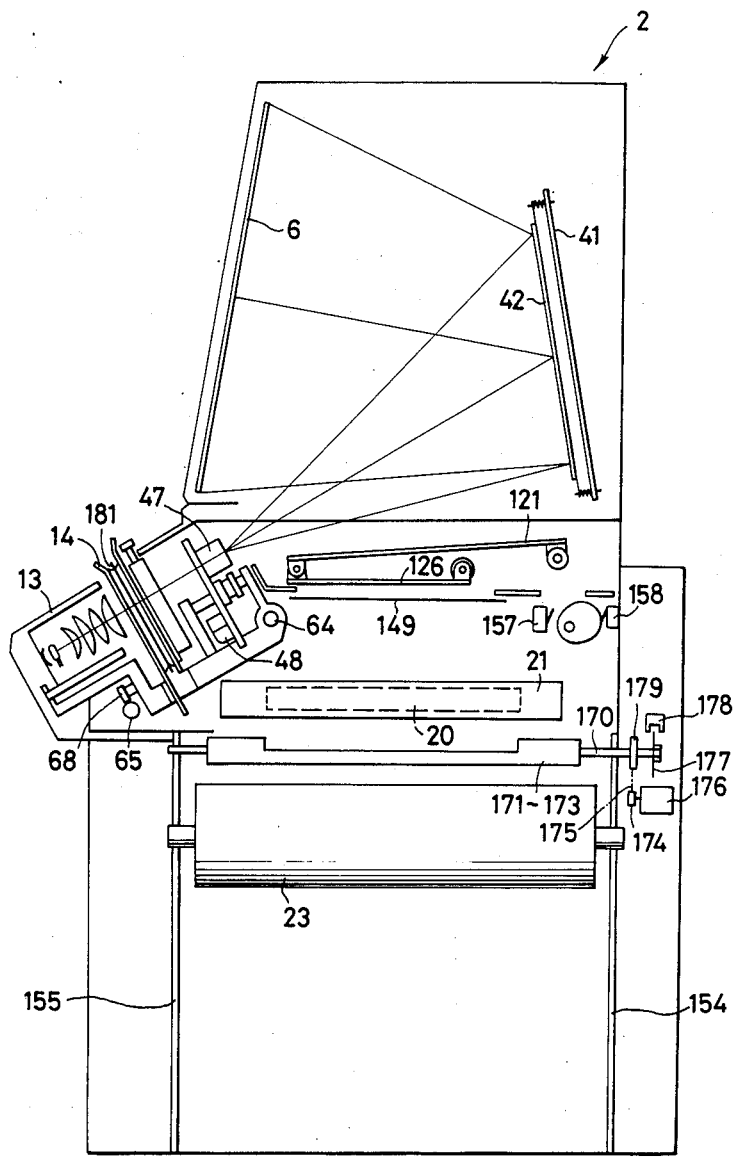
FIG. 5 is a side elevational view of an internal arrangement of the microfilm reader-printer.

A tension spring 145 is connected between a stud 144 on the follower lever 143 and a stud 142 on a lever 140 secured to the shaft 136 by a pin 141 for normally urging the follower lever 143 and the lever 140 to turn toward each other until a projection 140a on the lever 140 engages the follower lever 143 in the condition of FIG. 5.

As shown in FIG. 3, a pin 139 is fixed to the shaft 136 and engages in a hole 138 defined in a support plate 121 angularly movably supported on the shaft 136 by a support arm 137. Clockwise rotation of the follower lever 143 caused by the clockwise rotation of the cam 148 enables the tension spring 145 to turn the lever 140 clockwise. This clockwise turning of the lever 140 causes the pin 141 to turn the shaft 136 clockwise about its own axis, whereupon the pin 139 turns the support plate 121 clockwise about the shaft 136.

A shaft 124 is mounted on an end 123 of the support plate 121 remote from the support arm 137. A light shielding plate 126 is fixed at one end by a fixing member 127 to a bracket 125 angularly movably supported on the shaft 124. On the other other end of the light shielding plate 126, there is rotatably supported a roller 129 slidably held in guide grooves 131 (131a) defined in grooved cam plates 130 (130a) mounted by screws on side plates 66, 67 (FIG. 6). Although the grooved cam plate 130a is not shown in FIG. 3, it is identical in shape to the grooved cam plate 130, and hence the guide groove 131a is also identical in shape to the guide groove 131. The light shielding plate 126 is normally urged by a torsion spring 122 to turn clockwise about the shaft 124 for preventing the support plate 121 to turn counterclockwise under the weights of the first exposure mirror 19 and the support plate 121.

When the microfilm iamge is displayed on the screen 6, but not copied, the support plate 121 and the light shielding plate 126 are folded or collapsed out of the focused beam of light coming from the projection lens 47, as shown in FIG. 5.

When the print switch 12 is depressed to duplicate the microfilm image, the motor 147 is energized to turn the support plate 121 clockwise. Whe the support plate 121 is turned clockwise, the light shielding plate 126 is turned clockwise about the shaft 124 from the position of FIG. 5 to the position of FIG. 3. The roller 129 is guided by the guide grooves 131 (131a) until it engages one end thereof as shown in FIG. 3. More specifically, when the follower lever 143 is turned by the cam 148, the lever 140 is also turned therewith. Continued angular movement of the follower lever 143 forces itself to be separated from the projection 140a on the lever 140. The tension spring 145 is extended to urge the lever 140 to turn further clockwise. The support plate 121 is also urged by the tension spring 145 to turn clockwise.

Under the bias of the tension spring 145 and by the engagement of the roller 129 with the ends of the guide grooves 131 (131a), the support plate 121 and hence the first exposure mirror 19 are positioned for projecting the magnified and projected image of the microfilm onto the photosensitive body 23 via the second and third exposure mirrors 20, 21 (FIG. 4).

The position of the first exposure mirror 19 for projecting the microfilm image onto the photosensitive body 23 can be adjusted by turning the grooved cam plates 130 (130a) about screws 133 (133a) and fixing the grooved cam plates 130 with screws 134 (134a). When the first exposure mirror 19 is thus positioned as shown in FIG. 3, the cam 148 actuates a microswitch 157 to de-energize the motor 147.

At the time the support plate 121 and the light shielding plate 126 are positioned as shown in FIG. 3, external light entering through the screen 6 is cut off by a light shielding plate 160, the light shielding plate 126, the support plate 126, and a shield plate 135 to guard against reaching the second and third exposure mirrors 20, 21 through an opening 135a in the shield plate 135. The light shielding plate 126 is particularly effective in preventing such external light from falling on the first exposure mirror 19. With this arrangement, the external light passing through the screen 6 is prevented from entering as stray light while the photosensitive body 23 is exposed to the microscope image to copy the same.

A shutter plate 149 is supported on the shield plate 135 for angular movement between a position in which the shutter plate 149 closes the opening 135a and another position in which the shutter plate 149 opens the opening 135a, the shutter plate 149 being angularly movable by a rotary solenoid 156.

As shown in FIG. 4, a shield plate 151 is disposed at the bottom of an optical unit 4 positioned below the screen housing unit 2 and has an opening in the vicinity of the photosensitive body 23 for passage of projected light therethrough. A slit plate 152 and a movable slit plate 153 are attached by screws to the shield plate 151 adjacent to the opening therein for limiting the projected light toward the photosensitive body 23.

A light shielding unit 22 for shielding light in the transverse or widthwise direction of the sheet is disposed closely to the opening in the shield plate 151. The light shielding unit 22 comprises three light shielding plates 171, 172, 173 (FIG. 5) extending radially outwardly (FIG. 4) from a support shaft 170 rotatably supported on a pair of rear and front side plates 154, 155. The three light shielding plates 171, 172, 173 correspond respectively to copy sizes (A2Y, A3T), (A3Y, A4T), (A4Y). One of the light shielding plates corresponding to the selected copy size is turned into position for shielding light.

As illustrated in FIG. 5, the support shaft 170 is driven to rotate in one direction by a step motor 176 through a pulley 179, a belt 175, and a pulley 174. The rotation and stoppage of the support shaft 170 is controlled by a signal produced by a photosensor 178 energizable in cooperation with a photointerrupter 177 mounted on the support shaft 170.

Operation of the microfilm reader-printer is initiated by actuating the copy size selector switch 8 on the control panel 3.

The first exposure mirror 19 (FIG. 3) is positioned to project light for exposure, and the support frame 61 is brought to a position to start its preliminary travel for exposure and scanning. The lamp 93 is energized, and the step motor 77 is energized by the control circuit in response to a signal issued by a photosensor 34 in the sheet feeder unit 28 and indicative of the leading end of the transfer sheet 35. The speed of rotation of the step motor 77 is increased up to a level corresponding to the selected magnification. At the same time, the magnified image of the microfilm 181 is also moved. When the magnified microfilm image reaches a position where the photosensitive body 23 starts to be exposed to the magnified microfilm image, the optical axis of the projection lens 47 selected is in the position S in FIG. 1. The photosensitive body 23 then starts being exposed to the magnified microfilm image through the slit at a speed corresponding to the selected magnification. Simultaneously, the rotary solenoid 156 (FIG. 3) is energized to retract the shutter plate 149 out of the optical path to open the opening 135a.

As the projection lens 47 and the illuminating optical system 13 are moved in unison a distance corresponding to the selected magnification and copy size, the optical axis of the projection lens 47 reaches the position E in FIG. 1. The rotary solenoid 156 is then de-energized to allow the shutter plate 149 to close the opening 135a or cut off the optical path, and the lamp 93 is also deenergized.

In the above exposure and scanning mode, the magnified image of the microfilm is equal to the selected copy size. It is also possible to select a copy size larger than the magnified microfilm image. In such an instance, the distance SL (FIG. 1) which the projection lens 147 is to be moved for scanning is controlled such that the size of the microfilm is regarded as 1/m (m is the magnification) of the copy size. When the projection lens 47 arrives at the position E, a signal is generated to energize the step motor 77 to move the support frame 61 to the left in FIG. 6.

If only one copy is selected by the copy number setting switch 11, the support frame 61 returns to the reference position under the control of signals from the photosensor 84, the photointerrupter 83, the photosensor 79, and the encoder disk 78. At the same time, the motor 147 (FIG. 3) is energized to rotate the cam 148 in the direction of the arrow. When a microswitch 158 is actuated by the cam 148, the motor 147 is de-energized.

Upon rotation of the cam 148 in the direction of the arrow, the follower lever 143 is turned counterclockwise into contact with the projection 140a of the lever 140. Continued rotation of the cam 148 causes the shaft 136 and the support plate 121 to turn counterclockwise.

As the support plate 121 is thus turned counterclockwise, the light shielding plate 126 is turned counterclockwise about the shaft 124 while its distal end is being guided by the roller 129 slidingly engaging in the guide grooves 131 (131a). In the position wherein the cam 148 actuates the microswitch 158, the support plate 121 and the light shielding plate 126 are retracted out of the optical path along which the magnified microfilm image is projected by the projection lens 47 onto the screen 6.

When the support frame 61 returns to the reference position, a signal is produced to energize the lamp 93 to project the magnified microfilm image onto the screen 6.

For making a plurality of copies selected by the copy number setting switch 11, the shutter plate 149 closes the opening 135a when one cycle of exposure and scanning is completed by the movement of the support frame 61. Then, the support frame 61 is positioned by the externally threaded rod 73 driven by the step motor 77 and the resiliency of the spring 69 so that the optical axis of the projection lens 47 will be positioned leftwardly of the position S (FIG. 1) by a distance required by the support frame 61 to effect its preliminary travel, i.e., for the step motor 77 to reach the desired speed of rotation.

The rotation of the step motor 77 for such positioning is controlled by the signals from the photosensor 84, the photointerrupter 83, the photosensor 79, and the encoder disk 78. Therefore, the positioning of the support frame 61 can be effected with high accuracy.

In response to the signal from the photosensor 34 in the sheet feeder unit 28, the control circuit then energizes the step motor 77 to move the support frame 61 for starting a next cycle of exposure and scanning, and the shutter plate 149 is retracted out of the optical path. After the above process has been repeated as many times as desired to produce a desired number of copies, the shutter plate 149, the first exposure mirror 19, the support frame 61, and the lamp 93 are returned to their position for projecting the microfilm image onto the screen 6.

While the desired number of copies are being made, the lamp 93 is energized at a degree of brightness which is adjusted by the exposure adjusting knob 10 (FIG. 4).

In FIG. 4, the optical unit 4 disposed below the screen housing unit 2 is integral with an lower apparatus portion and cooperates therewith in providing a base apparatus portion. The screen housing unit 2 is angularly movable into and out of contact with the base apparatus portion and hence the optical unit 4.

Figure 2:
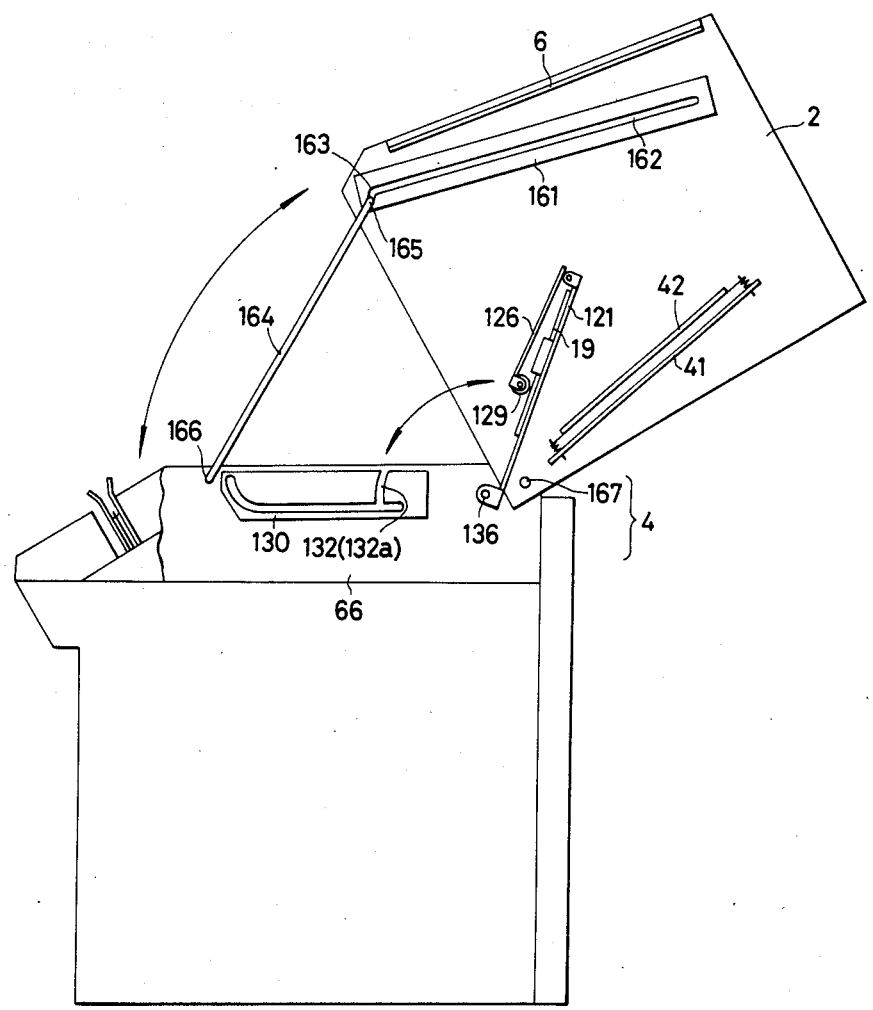
FIG. 2 is a side elevational view of a microfilm copying apparatus according to the present invention, constructed as a microfilm reader-printer having a screen housing unit and an optical unit, the screen housing unit being shown as being tilted into an open position.

As shown in FIG. 2, the screen housing unit 2 accomodates therein the screen 6, a projection mirror 42, and a bracket 41 by which the projection mirror 42 is supported. The screen housing unit 2 is pivotally mounted on the side plates 66, 67 (FIG. 6) of the optical unit 4 by means of a pin 167 (FIG. 2). The screen 6 has a lower end that can be fastened by screws (not shown) to the side plates 66, 67. As illustrated in FIGS. 4 and 5, the screen housing unit 2 as it is closed or held against the optical unit 4, the lower end of the screen 6 is fastened to the side plates 66, 67 by the screws. The screen housing unit 2 has a lower engaging portion engageable with the upper ends of the side plates 66, 67 for keeping the screen housing unit 2 and the optical unit 4 in a relative position.

As shown in FIG. 2, a guide plate 161 having a groove 162 is fixed to one of the side plates of the screen housing unit 2, and a stay 164 has one end pivotally supported on the side plate 66 of the optical unit 4. The opposite end 165 of the stay 164 slidably engages in the groove 162 of the guide plate 161. By removing the fastening screws and lifting the front portion of the screen housing unit 2, the screen housing unit 2 is turned clockwise (FIG. 2) about the pin 147 so as to be open with respect to the optical unit 4. The angle through which the screen housing unit 2 can be opened with respect to the optical unit 4 is limited when the end 165 of the stay 164 engages the lower end 163 of the groove 162 of the guide plate 161. In the position of FIG. 2, the center of gravity of the screen housing unit 2 is positioned righwardly of a vertical straight line passing through the pin 167. Therefore, the screen housing unit 2 is held stationary in the position of FIG. 2.

The support plate 121 supporting the first exposure mirror 19 can manually be turned upwardly away from the optical unit 4 by allowing the roller 129 on the light shielding plate 126 to move off recesses 132 (132a) of the guide grooves 131 (131a). The support plate 121 and the light shielding plate 126 can be held stationary in the position illustrated in FIG. 2 since their centers of gravity are positioned rightwardly of a vertical straight line passing through the shaft 136. The resiliency of the torsion spring 122 is selected such that the light shielding plate 126 is gravity-biased toward the support plate 121 against the resiliency of the torsion spring 122 in the position of FIG. 2.

Since the screen housing unit 2 is openable and closable with respect to the optical unit 4, the optical system components in the optical unit 4 can easily and safely be cleaned, maintained, and repaired.

For moving the screen housing unit 2 from the position of FIG. 2 back to the position of FIG. 5, the first exposure mirror 19 is first manually brought back to the position of FIG. 5, and then the screen housing unit 2 is closed with respect to the optical unit 4 and fastened thereto by the screws.

Comparison between the distances which the movable optical components according to the invention shown in FIG. 1 and the conventional arrangements of FIGS. 7 and are moved will be discussed below. In the inventive construction of FIG. 1, the distance SL which the movable optical component or the projection lens 47 is moved given by:

$$SL = \frac{bIo + aWS}{a + b}$$

where WS is the width of the slit through which the photosensitive body 23 is exposed.

The distance SF of movement of the movable component, i.e., the microfilm 181 in the arrangement of FIG. 7 is expressed by:

$$SF = \frac{bIo + aWS}{b}$$

Figure 8:
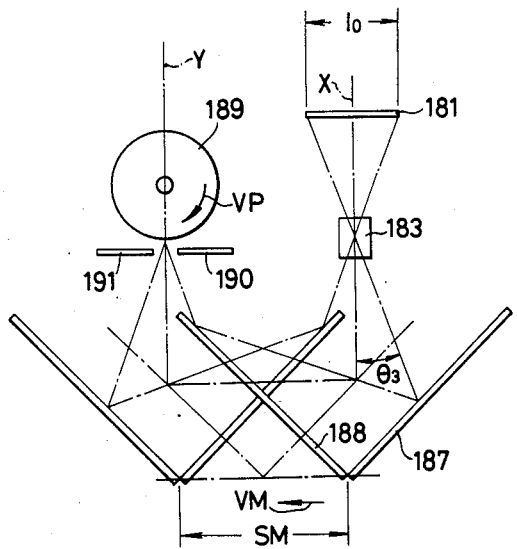

The distance SM of movement of the movable component, i.e., the mirrors 187, 188 in the arrangement of FIG. 8 is expressed by:

$$SM = \frac{bIo + aWS}{2b}$$

Therefore, assuming that a, b, Io, and WS are of the same values, the distance SL is the smallest among the distances SL, SF, and FM. According to the present invention, consequently, the distance which the movable component is moved is smaller than those of the conventional arrangements. Since the time required by the movable component returns is smaller if the distance of its movement is smaller, the copying efficiency is improved. The speeds VL, VF, FM of movement of the projection lens, the microfilm, and the mirrors are expressed respectively by $VL = VP/(1+m)$, $VF = VP/m$, and $VM = VP/2$. Inasmuch as the magnification m is normally in the range of from 10 to 20, the speed VL is the smallest. As a consequence, the speed of movement of the movable component for slit exposure in the apparatus of the present invention is smaller than those of the conventional apparatus. This can reduce vibrations and shocks which the optical system will be subject to during movement, with the result that copied microfilm images of good quality can be produced.

The slit exposure system shown in FIG. 1, the pivotal connection between the screen housing unit and the base apparatus portion, and the provision of the light shielding plate for preventing external unit from entering toward the first exposure mirror can be achieved entirely independently of each other.

Although a certain preferred embodiment has been shown and described, it should be understood that many changes and modifications may be made therein without departing from the scope of the appended claims.

What is claimed is:

1. A microfilm copying apparatus for magnifying and copying an image on a microfilm, comprising a slit exposure device for exposing a photosensitive body to an optical image of the microfilm through a slit, said slit exposure device comprising:
   an illuminating optical system having a light source and condenser means for concentrating light from the light source on the microfilm to illuminate the same;
   a slit exposure optical system for focusing a slit-shaped magnified image of the microfilm illuminated by said illuminating optical system onto said photosensitive body, said slit exposure optical system including a projection lens; and
   displacing means for moving said illuminating optical system and said projection lens in optically coaxial relation in a direction normal to a common optical axis thereof in synchronism with movement of the surface of said photosensitive body.

2. A microfilm copying apparatus constructed as a microfilm reader-printer for magnifying and projecting an image of a microfilm illuminated by an illuminating means onto a screen for display thereon and for magnifying and projecting the image onto a photosensitive body to copy the image as required, said microfilm copying apparatus comprising:
   a base apparatus portion; and
   a screen housing unit accommodating said screen and disposed above said base apparatus portion, said screen housing unit being angularly movable into and out of contact with said base apparatus portion.

3. A microfilm copying apparatus constructed as a microfilm reader-printer for magnifying and projecting an image of a microfilm illuminated by an illuminating means onto a screen for display thereon and for magnifying and projecting the image onto a photosensitive body to copy the image as required, said microfilm copying apparatus comprising:
   a base apparatus portion;
   a screen housing unit accommodating said screen and disposed above said base apparatus portion, said screen housing unit being angularly movable into and out of contact with said base apparatus portion; and
   a first exposure mirror angularly movably supported in said base apparatus portion for guiding a focused light beam bearing said image toward said photosensitive body, said first exposure mirror being retractable into said screen housing unit for copying the image on the photosensitive body.

4. A microfilm copying apparatus constructed as a microfilm reader-printer for magnifying and projecting an image of a microfilm illuminated by an illuminating means onto a screen for display thereon and for magnifying and projecting the image onto a photosensitive body to copy the image as required, said microfilm copying apparatus comprising a first exposure mirror device comprising:
   a first exposure mirror angularly movably supported and having a reflecting surface positionable in a focused light beam for copying the image on the photosensitive body;
   a light shielding plate angularly movably mounted on a free end of said first exposure mirror;
   a torsion spring acting between said first exposure mirror and said light shielding plate for normally urging the light shielding plate to turn away from said first exposure mirror;
   a grooved cam plate engaging a roller mounted on said free end of the light shielding plate for guiding said light shielding plate when the light shielding plate is angularly moved; and
   the arrangement being such that when said first exposure mirror is in a position to copy the image on the photosensitive body, said light shielding plate prevents external light passing through said screen from falling on said first exposure mirror.

5. A microfilm copying apparatus constructed as a microfilm reader-printer for magnifying and projecting an image of a microfilm illuminated by an illuminating means onto a screen for display thereon and for magnifying and projecting the image onto a photosensitive body to copy the image as required, said microfilm copying apparatus comprising a slit exposure device for exposing a photosensitive body to an optical image of the microfilm through a slit, said slit exposure device comprising:
   an illuminating optical system having a light source and condenser means for concentrating light from the light source on the microfilm to illuminate the same;
   a slit exposure optical system for focusing a slit-shaped magnified image of the microfilm illuminated by said illuminating optical system onto said photosensitive body, said slit exposure optical system including a projection lens; and
   displacing means for moving said illuminating optical system and said projection lens in optically coaxial relation in a direction normal to a common optical axis thereof in synchronism with movement of the surface of said photosensitive body, said slit exposure optical system also including a first exposure mirror device comprising:
   a first exposure mirror angularly movably supported and having a reflecting surface positionable in a focused light beam for copying the image on the photosensitive body;
   a light shielding plate angularly movably mounted on a free end of said first exposure mirror;
   a torsion spring acting between said first exposure mirror and said light shielding plate for normally urging the light shielding plate to turn away from said first exposure mirror;
   a grooved cam plate engaging a roller mounted on said free end of the light shielding plate for guiding said light shielding plate when the light shielding plate is angularly moved; and
   the arrangement being such that when said first exposure mirror is in a position to copy the image on the photosensitive body, said light shielding plate prevents external light passing through said screen from falling on said first exposure mirror, said microfilm copying apparatus further comprising:
a base apparatus portion containing said slit exposure device; and
a screen housing unit accommodating said screen and disposed above said base apparatus portion, said screen housing unit being angularly movable into and out of contact with said base apparatus portion, said first exposure mirror and said light shielding plate being retractable above said base apparatus portion through a recess of said grooved cam plate.

* * * * *